US008078326B2

(12) United States Patent
Harrod et al.

(10) Patent No.: US 8,078,326 B2
(45) Date of Patent: Dec. 13, 2011

(54) HVAC SYSTEM CONTROLLER CONFIGURATION

(75) Inventors: Greg R. Harrod, Wichita, KS (US);
Brian D. Rigg, Douglass, KS (US);
Nathan T. Ostrye, Wichita, KS (US);
Jedidiah O. Bentz, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 581 days.

(21) Appl. No.: 12/234,378

(22) Filed: Sep. 19, 2008

(65) Prior Publication Data
US 2010/0076605 A1    Mar. 25, 2010

(51) Int. Cl.
*G06F 19/00* (2011.01)
(52) U.S. Cl. .............................. 700/276; 700/298; 62/77
(58) Field of Classification Search ................. 700/276, 700/277, 299, 300, 9, 12, 19, 27, 75, 83, 700/100, 278; 236/46 R, 91, 49.3; 62/132; 67/77, 129, 154; 710/8; 713/1, 199; 702/122, 702/183, 188
See application file for complete search history.

(56) References Cited

U.S. PATENT DOCUMENTS

| | | | | |
|---|---|---|---|---|
| 4,497,031 A | * | 1/1985 | Froehling et al. ............. | 700/276 |
| 5,306,995 A | * | 4/1994 | Payne et al. .................... | 318/561 |
| 5,349,644 A | * | 9/1994 | Massey et al. .................. | 706/10 |
| 5,495,608 A | * | 2/1996 | Antoshenkov ........................ | 1/1 |
| 5,819,255 A | * | 10/1998 | Celis et al. ............................. | 1/1 |
| 5,935,252 A | * | 8/1999 | Berglund et al. ............. | 713/300 |
| 6,205,441 B1 | * | 3/2001 | Al-omari et al. ...................... | 1/1 |
| 6,619,555 B2 | | 9/2003 | Rosen | |
| 6,721,817 B1 | * | 4/2004 | Khosrowpour .................... | 710/8 |
| 6,919,809 B2 | * | 7/2005 | Blunn et al. ................... | 340/632 |
| 7,000,849 B2 | | 2/2006 | Ashworth et al. | |
| 7,114,554 B2 | | 10/2006 | Bergman et al. | |
| 7,156,316 B2 | | 1/2007 | Kates | |
| 7,188,002 B2 | | 3/2007 | Chapman, Jr. et al. | |
| 7,212,887 B2 | | 5/2007 | Shah et al. | |
| 7,225,054 B2 | | 5/2007 | Amundson et al. | |
| 7,243,004 B2 | | 7/2007 | Shah et al. | |
| 7,254,649 B2 | * | 8/2007 | Subramanian et al. ........... | 710/8 |
| 7,274,973 B2 | * | 9/2007 | Nichols et al. ................ | 700/276 |
| 7,308,384 B2 | | 12/2007 | Shah et al. | |
| 7,447,612 B2 | * | 11/2008 | Keyes et al. ................... | 702/188 |
| 7,451,606 B2 | * | 11/2008 | Harrod ............... | 62/77 |
| 7,464,260 B2 | * | 12/2008 | Milligan et al. .............. | 713/100 |
| 7,775,452 B2 | * | 8/2010 | Shah et al. ........................ | 236/51 |
| 2009/0101725 A1 | * | 4/2009 | Dolan et al. .................. | 236/49.3 |
| 2009/0199580 A1 | * | 8/2009 | Lyon ............................... | 62/157 |
| 2010/0106307 A1 | * | 4/2010 | Grohman et al. ............. | 700/276 |
| 2010/0106314 A1 | * | 4/2010 | Grohman ...................... | 700/276 |

* cited by examiner

*Primary Examiner* — Dave Robertson
(74) *Attorney, Agent, or Firm* — Fletcher Yoder

(57) ABSTRACT

Control devices for configuring heating, ventilating, air conditioning, and cooling (HVAC) systems are provided. The control devices are designed to detect operational parameters of units within HVAC systems and present system configurations consistent with the detected parameters. In response to user selection of a system configuration, the control device may apply the system configuration to the HVAC system and may reconfigure settings of control circuits within system units. The system configurations presented by the control device may correspond to wiring diagrams that are familiar to service technicians. Methods of configuring HVAC systems with the control devices are also provided.

24 Claims, 8 Drawing Sheets

HVAC SYSTEM CONTROLLER CONFIGURATION

BACKGROUND

The invention relates generally to heating, ventilating, air conditioning, and refrigeration systems, and controllers for configuring these systems.

A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

Residential systems generally include an indoor unit, such as an air handler or a furnace, and an outdoor unit, such as a heat pump or an air conditioner. A system controller, such as a thermostat, may be connected to control circuits within the indoor and outdoor units to control operation of the HVAC system. Traditionally, the HVAC systems may be wired and controlled using relays, switches, and 24 volt alternating current (VAC) low voltage wiring that connects the inputs and outputs of each control circuit.

Installers and service technicians are used to configuring HVAC systems by implementing wiring schemes based on conventional 24 VAC wiring. However, current HVAC systems may be communicating systems that replace traditional 24 VAC signals with serial communications for sending command signals and communication packets. These communicating systems may have a structure that is unfamiliar to service technicians and, therefore, more difficult to troubleshoot and configure. In communicating systems, the system controller may be used to configure and troubleshoot the HVAC system.

SUMMARY

The present invention relates to a control device for a heating, ventilating, and air conditioning system (HVAC) that includes an indoor unit and an outdoor unit coupled to one another to implement a refrigeration cycle and coupled to the control device for the exchange of control signals. The indoor and outdoor units each include a respective control circuit. The control device includes a processor and configuration code implemented by the processor for discovering operational configurations of the control circuits of the indoor and outdoor units.

The present invention also relates to a method for configuring an HVAC system that includes an indoor unit and an outdoor unit coupled to one another to implement a refrigeration cycle and coupled to the control device for the exchange of control signals. The indoor and outdoor units each include a respective control circuit. The method includes receiving a user input of a system operational configuration identification based upon a wired system arrangement and digitally configuring at least one of the indoor unit control circuit, the outdoor unit control circuit or configuration code of a processor of the control device based upon the received input to emulate the wired system arrangement.

The present invention further relates to systems and methods employing the control devices.

DRAWINGS

DETAILED DESCRIPTION

Figure 1:
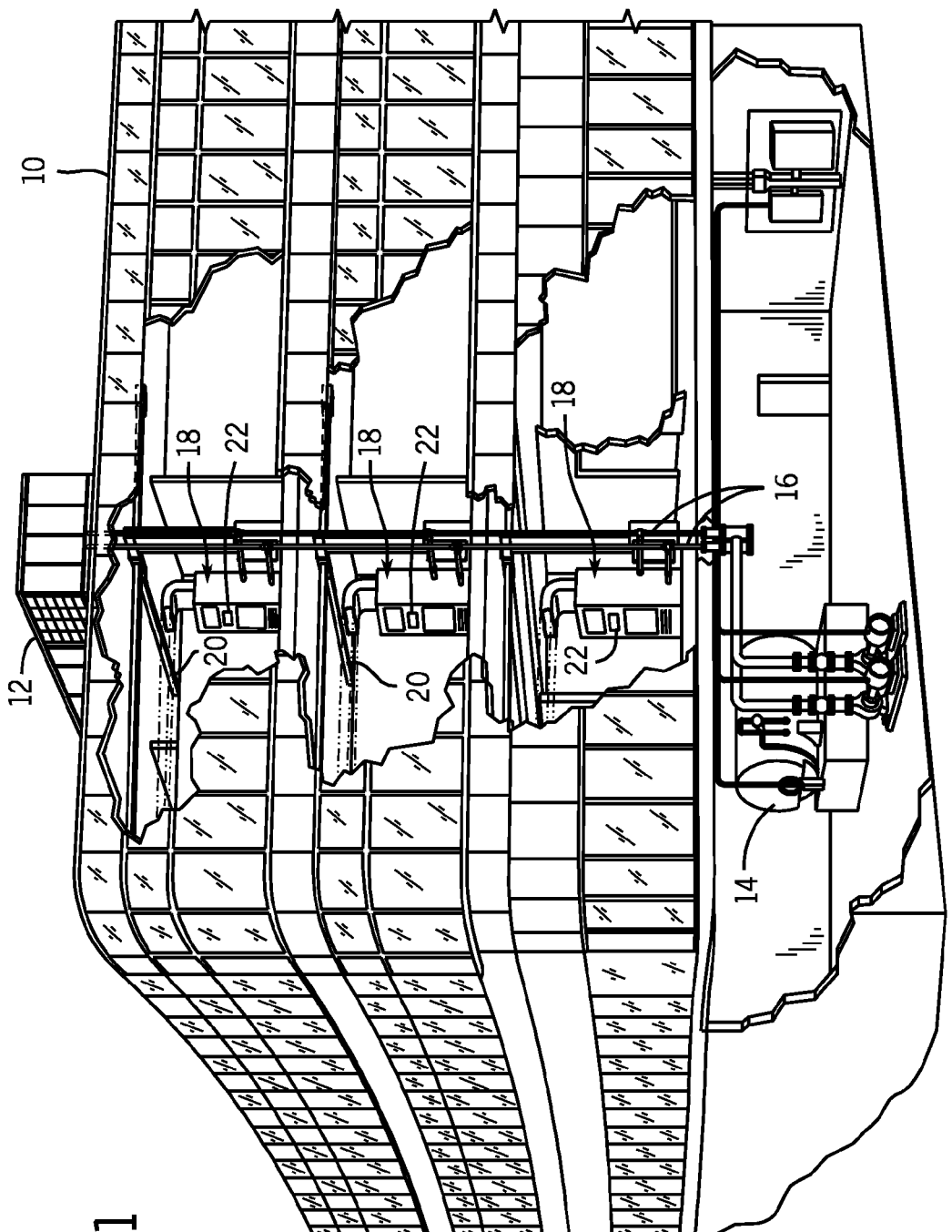
FIG. 1 is an illustration of an exemplary embodiment of a commercial or industrial HVAC system that employs heat exchangers.

FIG. 1 illustrates an exemplary application, in this case an HVAC system for building environmental management that may be a communicating system employing one or more control devices functioning as system controllers. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments, or offices, to maintain the environments at a designated temperature. A control device 22, shown here as including a thermostat, may be used to designate the temperature of the conditioned air. Control device 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
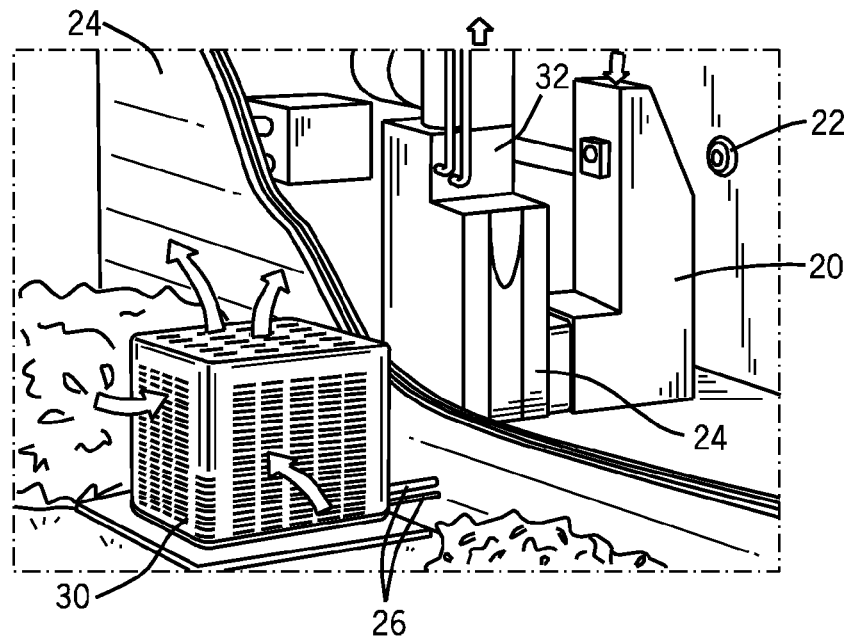
FIG. 2 is an illustration of an exemplary embodiment of a residential HVAC system that employs heat exchangers.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 will include refrigerant conduits 26 that operatively couple an indoor unit 28 to an outdoor unit 30. Indoor unit 28 may be positioned in a utility room, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a coil in outdoor unit 30 serves as a condenser for recondensing vaporized refrigerant flowing from indoor unit 28 to outdoor unit 30 via one of the refrigerant conduits 26. In these applications, a coil of the indoor unit, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan (not shown), and expels the air as indicated by the arrows above the outdoor unit. When operating as an air conditioner, the air is heated by the condenser coil within the outdoor unit and exits the top of the unit at a temperature higher than it entered the sides. Air is blown over indoor coil 32 and is then circulated through residence 24 by means of ductwork 20, as indicated by the arrows entering and exiting ductwork 20. The overall system operates to maintain a desired temperature as set by system controller 22. When the temperature sensed inside the residence is higher than the set point on the thermostat (plus a small amount), the air conditioner will become operative to refrigerate additional air for circulation through the residence. When the temperature reaches the set point (minus a small amount), the unit will stop the refrigeration cycle temporarily.

When the unit in FIG. 2 operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 32 will receive a stream of air blown over it and will heat the air by condensing a refrigerant.

Figure 3:
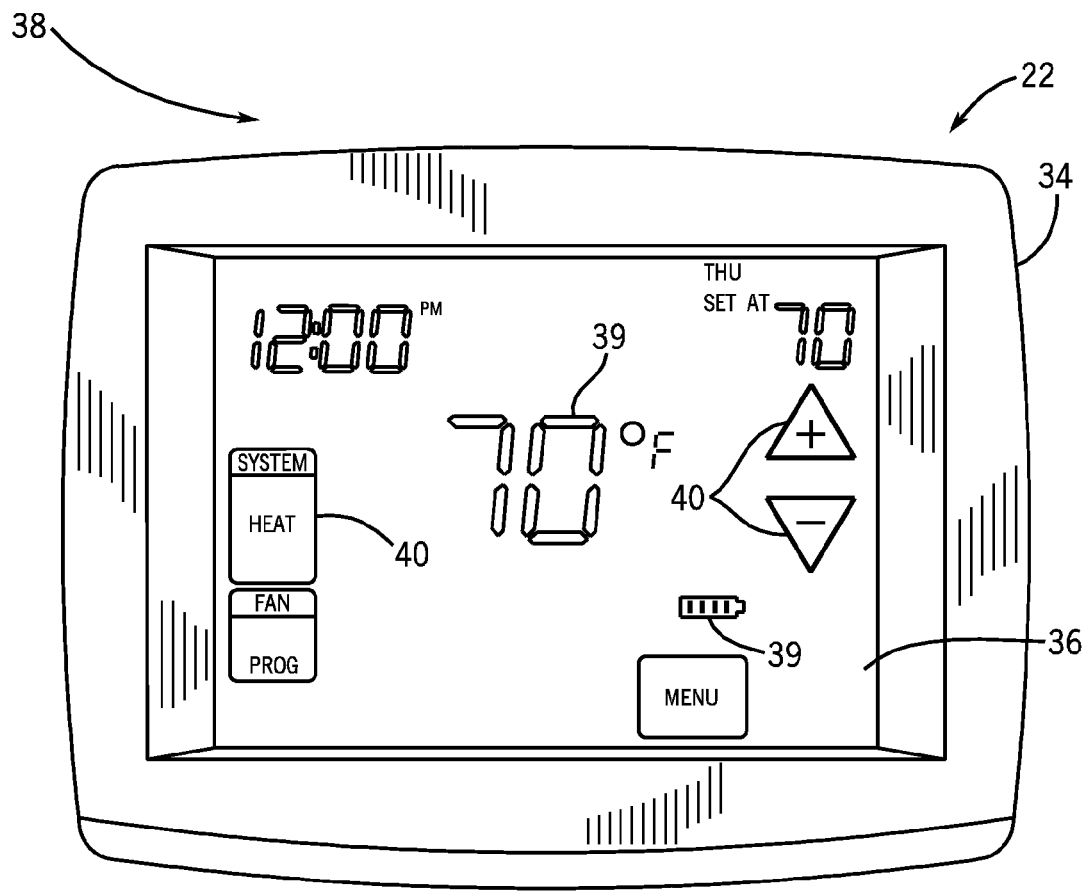
FIG. 3 is a perspective view of the control device shown in FIGS. 1 and 2.

FIG. 3 is a front view of the control device 22, shown here as including a digital programmable thermostat. In other embodiments, the control device may include a 24 VAC thermostat, or other suitable temperature controller. The control device may be used to control one or more indoor and/or outdoor units. Control device 22 is protected by an enclosure 34 that protects the interior components from physical damage and shields them from environmental hazards such as dust and electromagnetic interference. The enclosure may be formed from any suitable material such as plastic, metal, or a composite material. A display 36 is mounted within enclosure 34 and may be used to display various images and text generated by the device. The display may be any type of display such as a liquid crystal display, a light emitting diode display, an organic light emitting diode display, or other suitable display and may be capable of displaying text strings or high-resolution color graphics. Additionally, the display may include a touch-sensitive element, such as a touch screen.

The display 36 may be used to display a user interface 38 that allows a user to interact with the device. User interface 38 may include various layers, windows, screens, templates, elements, or other components that may be displayed in all, or a portion, of display 36. Generally, user interface 38 may include textual and graphical elements that represent applications and functions of control device 22. For example, user interface 38 may include status indicators 39 that display the status of the system, the temperature set point, the heating or cooling mode, and messages alerting a user when service is needed. User interface 38 also may include graphical elements 40 that may represent icons, buttons, sliders, menu bars, and the like. Graphical elements 40 may be selected by a user through the touch screen, through a remote control in communication with control device 22, or through manually actuatable buttons located on control device 22. In certain embodiments, graphical elements 40 may be selected to increase or decrease the temperature set point or to change the system mode between heating and cooling. Graphical elements 40 also may be selected by a service technician to configure the HVAC system and to change system settings.

Figure 4:
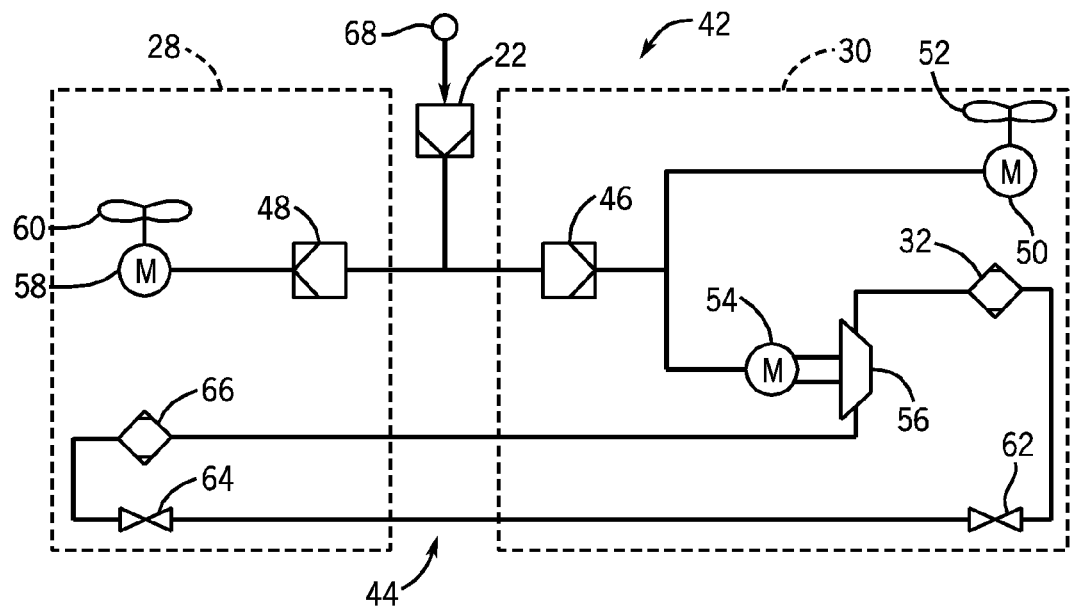
FIG. 4 is a block diagram of an exemplary embodiment of an HVAC system that employs a control device.

FIG. 4 is a block diagram of an HVAC system 42 that includes the control device 22, indoor unit 28 functioning as an air handler, and outdoor unit 30 functioning as a heat pump. Refrigerant flows through system 42 within a closed refrigeration loop 44 between outdoor unit 30 and indoor unit 28. The refrigerant may be any fluid that absorbs and extracts heat. For example, the refrigerant may be hydrofluorocarbon (HFC) based R-410A, R-407C, or R-134a.

The operation of indoor and outdoor units 28 and 30 is controlled by control circuits 48 and 46, respectively. The control circuits 46 and 48 may execute hardware or software control algorithms to regulate the HVAC system. According to exemplary embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications.

The control circuits 46 and 48 may receive control signals from control device 22 and transmit the signals to equipment located within indoor unit 28 and outdoor unit 30. For example, outdoor control circuit 46 may route control signals to a motor 50 that powers a fan 52 and to a motor 54 that powers a compressor 56. Indoor control circuit 48 may route control signals to a motor 58 that powers a fan 60. The control circuits also may transmit control signals to other types of equipment such as valves 62 and 64, sensors, and switches.

According to exemplary embodiments, control device 22 may communicate with control circuits 46 and 48 by transmitting communication packets over a serial communication interface. Control device 22 may function as the master system controller while control circuits 46 and 48 operate as slave devices. In certain embodiments, control device 22 may send a ping message to discover connected slave devices and their properties. For example, control circuits 46 and 48 may transmit an acknowledgement message in response to receiving a ping message from control device 22. Control circuits 46 and 48 also may transmit information, in response to requests from control device 22, identifying the type of unit and specific properties of the unit. For example, control circuit 46 may transmit a signal to control device 22 indicating that it controls a two-stage heat pump with auxiliary heat and a bonnet sensor. Control circuits 46 and 48 also may transmit signals identifying terminal connections and jumper settings of the control circuits.

Control device 22 may operate to control the overall heating and cooling provided by indoor and outdoor units 28 and 30. Indoor and outdoor units 28 and 30 include coils 66 and 32, respectively, that both operate as heat exchangers. The coils may function either as an evaporator or a condenser depending on the heat pump operation mode. For example, when heat pump system 42 is operating in cooling (or "AC") mode, outside coil 32 functions as a condenser, releasing heat to the outside air, while inside coil 66 functions as an evaporator, absorbing heat from the inside air. When heat pump system 42 is operating in heating mode, outside coil 32 functions as an evaporator, absorbing heat from the outside air, while inside coil 66 functions as a condenser, releasing heat to the inside air. A reversing valve may be positioned on closed loop 44 to control the direction of refrigerant flow and thereby to switch the heat pump between heating mode and cooling mode.

Heat pump system 42 also includes two metering devices 62 and 64 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when heat pump system 74 is operating in cooling mode, refrigerant bypasses metering device 62 and flows through metering device 64 before entering inside coil 66, which acts as an evaporator. In another example, when heat pump system 42 is operating in heating mode, refrigerant bypasses metering device 64 and flows through metering device 62 before entering outside coil 32, which acts as an evaporator. According to other exemplary embodiments, a single metering device may be used for both heating mode and cooling mode. The metering devices typically are thermal or electronic expansion valves, but also may be orifices or capillary tubes.

The refrigerant enters the evaporator, which is outside coil 32 in heating mode and inside coil 66 in cooling mode, as a low temperature and pressure liquid. Some vapor refrigerant also may be present as a result of the expansion process that occurs in metering device 62 or 64. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 56. Compressor 56 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 56, the increased temperature and pressure vapor refrigerant flows into a condenser, the location of which is determined by the heat pump mode. In cooling mode, the refrigerant flows into outside coil 32 (acting as a condenser). Fan 52, which is powered by motor 50, draws air across the tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside coil 66 (acting as a condenser). Fan 60, which is powered by motor 58, draws air across the tubes containing refrigerant vapor. The heat from the refrigerant is transferred to the inside air causing the refrigerant to condense into a liquid.

After exiting the condenser, the refrigerant flows through the metering device (62 in heating mode and 64 in cooling mode) and returns to the evaporator (outside coil 32 in heating mode and inside coil 66 in cooling mode) where the process begins again.

In both heating and cooling modes, motor 54 drives compressor 56 and circulates refrigerant through reversible refrigeration/heating loop 44. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 54 is controlled by control circuit 46. Control circuit 46 may receive control signals from control device 22. In certain embodiments, control device may receive information from a sensor 68 that measures the ambient indoor air temperature. Control device 22 then compares the air temperature to the temperature set point (which may be input by a user) and engages compressor motor 54 and fan motors 50 and 58 to run the cooling system if the air temperature is above the temperature set point. In heating mode, control device 22 compares the air temperature from sensor 68 to the temperature set point and engages motors 50, 54, and 58 to run the heating system if the air temperature is below the temperature set point.

The control circuit 46 and control device 22 also may initiate a defrost cycle when the system is operating in heating mode. When the outdoor temperature approaches freezing, moisture in the outside air that is directed over outside coil 32 may condense and freeze on the coil. Sensors may be included within outdoor unit 30 to measure the outside air temperature and the temperature of outside coil 32. These sensors provide the temperature information to the control circuit 46 which determines when to initiate a defrost cycle.

Figure 5:
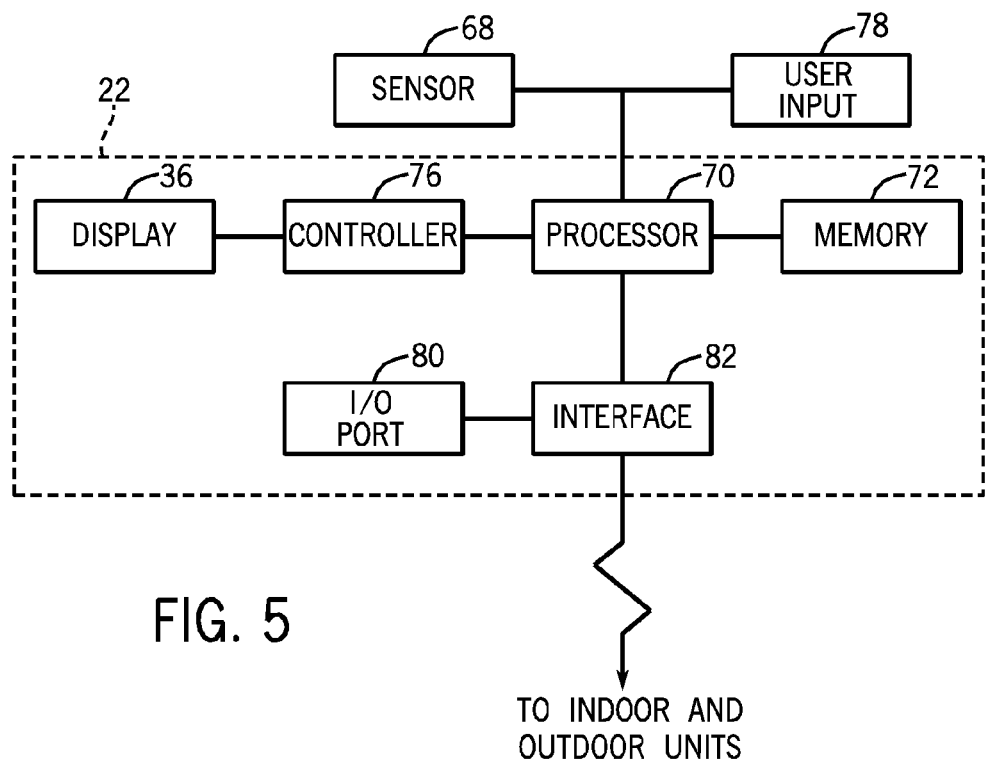
FIG. 5 is a block diagram of an exemplary embodiment of a control device.

FIG. 5 is a simplified block diagram illustrating various components and features of control device 22 in accordance with one embodiment. The block diagram includes display 36 discussed above with respect to FIG. 3, as well as many other components. As noted above with respect to FIG. 4, the control device 22 may be used to control operation of an HVAC system with one or more indoor and outdoor units, such as indoor unit 28 and outdoor unit 30. In certain embodiments, each of the units may include a control circuit communicatively coupled to the control device. However, in other embodiments, only some of the units may include control circuits, and the units without control circuits may be wired to and controlled by control circuits within the other units and/or by the control device. Further, the control device may be employed to control a system with only one unit. For example, an HVAC system may provide only heating using an indoor unit such as a furnace. No outdoor unit may be included and no refrigerant may be involved.

The operation of control device 22 may be controlled by a processor 70 that provides the processing capability for the control device. In certain embodiments, the processor 70 may include one or more microprocessors, instruction set processors, graphics processors, and/or related chip sets. Processor 70 may cooperate with a memory 72 that stores executable code, data, and instructions for processor 70. For example, the memory 72 may store machine-readable code for discovering indoor and outdoor units connected to the HVAC system. According to exemplary embodiments, the memory 72 may store machine-readable code for validating a system configuration and applying settings corresponding to the system configuration. Memory 72 also may store protocol information and instructions for allowing communication between control device 22 and connected units. The memory may include volatile memory such as random access memory and/or nonvolatile memory such as read only memory, flash memory, a hard drive, or any other suitable optical, magnetic, or solid-state computer readable media, as well as a combination thereof.

Memory 72 also may store components of user interface 38 (FIG. 3), such as graphical elements, screens, and templates, that may be shown on display 36. A controller 76 may provide the infrastructure for exchanging data between processor 70 and display 36. According to certain embodiments, controller 76 may be an integrated circuit. Further, controller 76 may exist as a separate component or be integrated into display 36 or processor 70. According to exemplary embodiments, controller 76 may govern operation of display 36 and may process graphics and text for display on display 36.

The display 36 may display screens of user interface 38 prompting a user to enter a user input 78. User input 78 may include a value specifying properties of the HVAC system. For example, a screen may prompt a user to select one of the graphical elements 40 to adjust a temperature set point or to determine the heating or cooling mode. During installation of the HVAC system, a screen may prompt a technician to enter a user input, such as a system identifier corresponding to a system configuration. Further, display 36 may display troubleshooting screens prompting a technician to adjust settings of the indoor and outdoor units. User input 78 may be received through a touch screen included in display 36 or through actuation of buttons, knobs, or other mechanical elements located within device 22.

User input 78 also may be received through an input/output (I/O) port 80. The I/O port may be a serial port, USB port, IEEE-1394 port, network interface, or other suitable interface configured to receive input from an external device. For example, the I/O port may be a USB port for connecting to a USB drive or flash drive. In certain embodiments, the I/O port may be a wireless interface for connecting to a computer, cell phone, or personal navigation device over a wireless network, such as an IEEE 802.11x wireless network. According to exemplary embodiments, a system configuration may be received through I/O port 80.

A communication interface 82 may transmit information received through I/O port 80 to processor 70. In certain embodiments, interface 82 may process data prior to transmitting the data to processor 70. Interface 82 also may provide an infrastructure for communicating information from I/O port 80 and processor 70 to indoor and outdoor units within the HVAC system. For example, processor 70 may receive a system configuration through I/O port 80 and may determine unit settings and parameters based on the system configuration. Processor 70 may transmit and apply the settings to the indoor and outdoor units through interface 82.

In certain embodiments, the communication interface may be a serial communication interface including one or more protocols for transmitting and/or receiving communication packets containing control signals. For example, the communication interface may employ one or more protocols such as Modbus, BACnet, DNET, or PROFIBUS (Process Field Bus). In certain embodiments, the communication interface may include a Controller Area Network (CAN) chip for communicating with the indoor and outdoor units and/or external devices. According to exemplary embodiments, communication interface 82 may employ packet switching to route communication packets to the indoor and outdoor units. Further, communication interface 82 may cooperate with memory 72. For example, memory 72 may store code for configuring the indoor and outdoor unit control based on the input system identifier.

Figure 6:
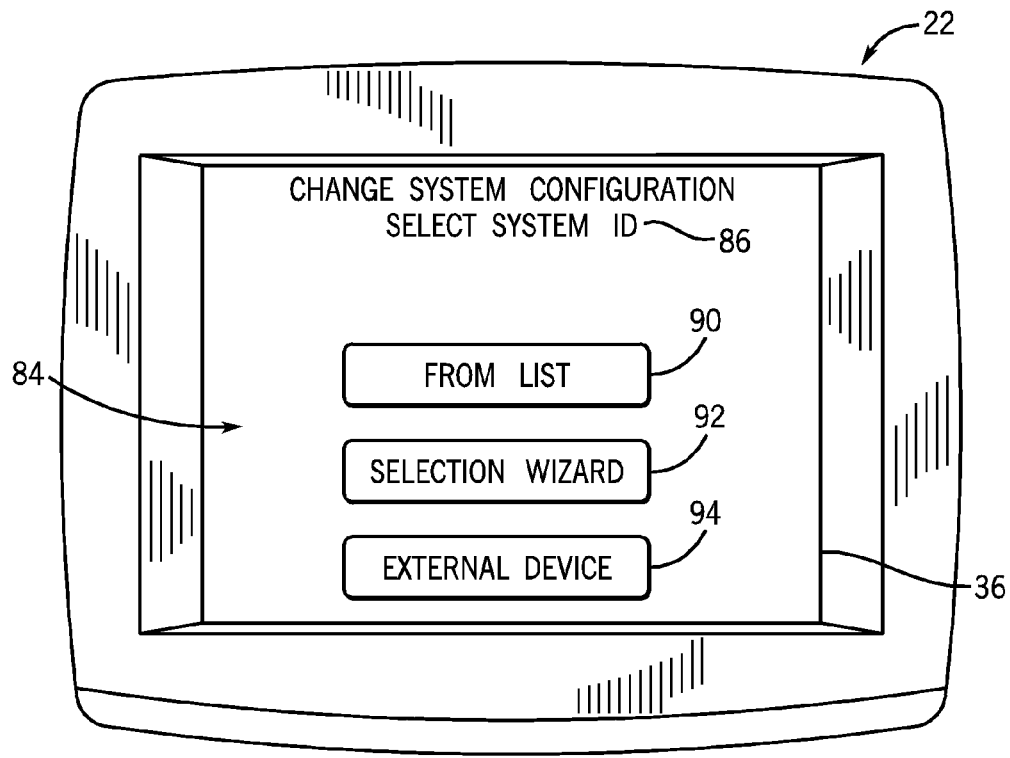
FIG. 6 is a front view of the control device of FIG. 5 displaying a screen for changing the system configuration.

FIG. 6 depicts a screen 84 of the user interface of device 22 for changing or initially entering a system configuration. Screen 84 includes instructions 86 prompting a user to select a method for selecting a system identifier. The system identifier may be a short phrase consisting of letters, numbers, symbols and/or graphics that represent a HVAC system configuration. The identifier may be stored within memory 72 (FIG. 5) along with the corresponding operational parameters and settings that define the system configuration for that identifier. For example, the system identifier may specify the components, such as zoning control panels, humidifiers, dehumidifiers, energy recovery ventilators, and heat recovery ventilators, that should be included within the HVAC system. The system identifier also may specify the types of indoor and outdoor units that should be connected to the HVAC system. In certain embodiments, the system identifier may specify whether the outdoor unit should be a heat pump or air conditioner, whether the indoor unit should be a furnace or an air handler, the number of stages within each unit and whether the unit allows modulation between the stages, and the auxiliary equipment, such as bonnet sensors, electronic air cleaners, discharge temperature sensors, and humidifiers, required within the indoor and outdoor units. The system identifier also may specify the terminal connections within and between the indoor and outdoor unit control circuits. For example, in system configurations employing an air handler as the indoor unit, the system identifier may specify whether first and second auxiliary heating terminals of the indoor unit control circuit should be connected together or connected to the first or second stage heating terminals of the outdoor unit control circuit.

The system identifier also may specify terminal connections between control device 22 and the indoor and outdoor unit control circuits. For example, the system identifier may specify whether the second stage compressor terminal of control device 22 is connected to the second stage compressor terminal of the outdoor unit or connected to the second stage compressor terminal of the indoor unit. As will be appreciated, the terminal connections may be made using physical wiring, virtual wiring arrangements employing digital signals, or combinations thereof. The connections between control device 22 and the indoor and outdoor control circuits may be customized using system identifiers to determine the heating and cooling properties of the HVAC system, such as the amount and type of heating and cooling applied. For example, in certain embodiments, the system identifier may determine whether first stage or second stage heating is applied, as well as whether auxiliary heating is provided using electric heat or fossil fuel heat.

Screen 84 also includes graphical elements 90, 92, and 94 that may be selected by a user to identify the method of selecting the system identifier. Each graphical element 90, 92, and 94 represents a different type of selection process. Graphical element 90 may be selected to pick the system identifier from a list of system identifiers. This method will be described in detail below with respect to FIGS. 7 through 11.

Graphical element 92 may be selected to enter a mode where control device 22 automatically selects the system identifier based on detected properties of the HVAC system. This method will be described in detail below with respect to FIGS. 12 and 13. Graphical element 94 may be selected to enter a system identifier using an external device. For example, the external device may be connected to control device 22 through I/O port 80 (FIG. 5). Of course, graphical elements 90, 92, and 94 are provided for illustrative purposes only and are not intended to be limiting. For example, only one or some of the selection methods may be displayed. Further, in certain embodiments, control device 22 may be configured to default to one of the selection methods and the graphical elements 90, 92, and 94 may be omitted.

Figure 7:
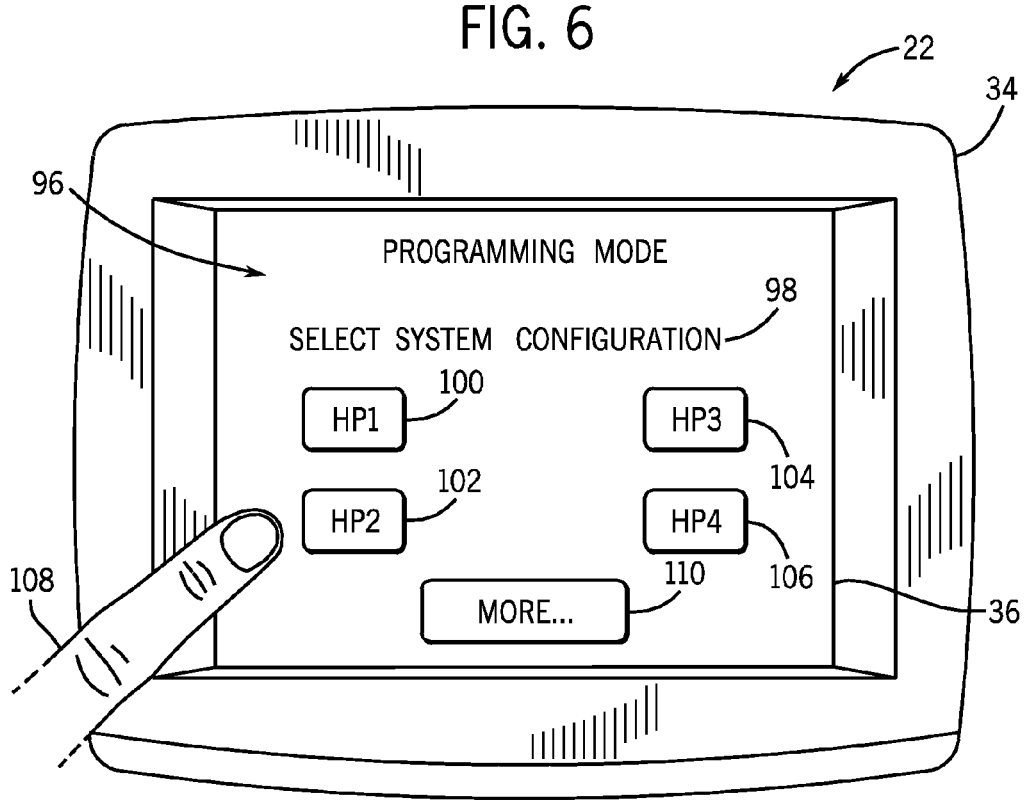
FIG. 7 is a front view of the control device of FIG. 5 displaying a screen for selecting a system identifier.

FIG. 7 depicts a screen 96 that may be displayed to facilitate selection of a system configuration from a list of system identifiers. Screen 96 may be displayed in response to selection of graphical element 90 shown in FIG. 6. Screen 96 includes instructions 98 prompting a user to select the system configuration by choosing a system identifier represented by a graphical element 100, 102, 104, or 106. The graphical elements 100, 102, 104, and 106, display system identifiers that each represent a system configuration. For example, the system identifier "HP1" may represent a system that includes an air handler and a heat pump with first stage electric heat of 5 kW and second stage electric heat of 15 kW. The system identifier "HP2" may represent a system configuration that includes an air handler and a heat pump with first stage electric heat of 10 kW and second stage electric heat of 15 kW. A user 108 may select the graphical elements to program the HVAC system to the system configuration represented by the system identifier. According to exemplary embodiments, the user 108 may be an HVAC service technician. More system identifiers may be displayed by selecting a graphical element 110. The system configurations represented by the system identifiers may be identified using a reference material, such as a reference book or binder.

Figure 8:
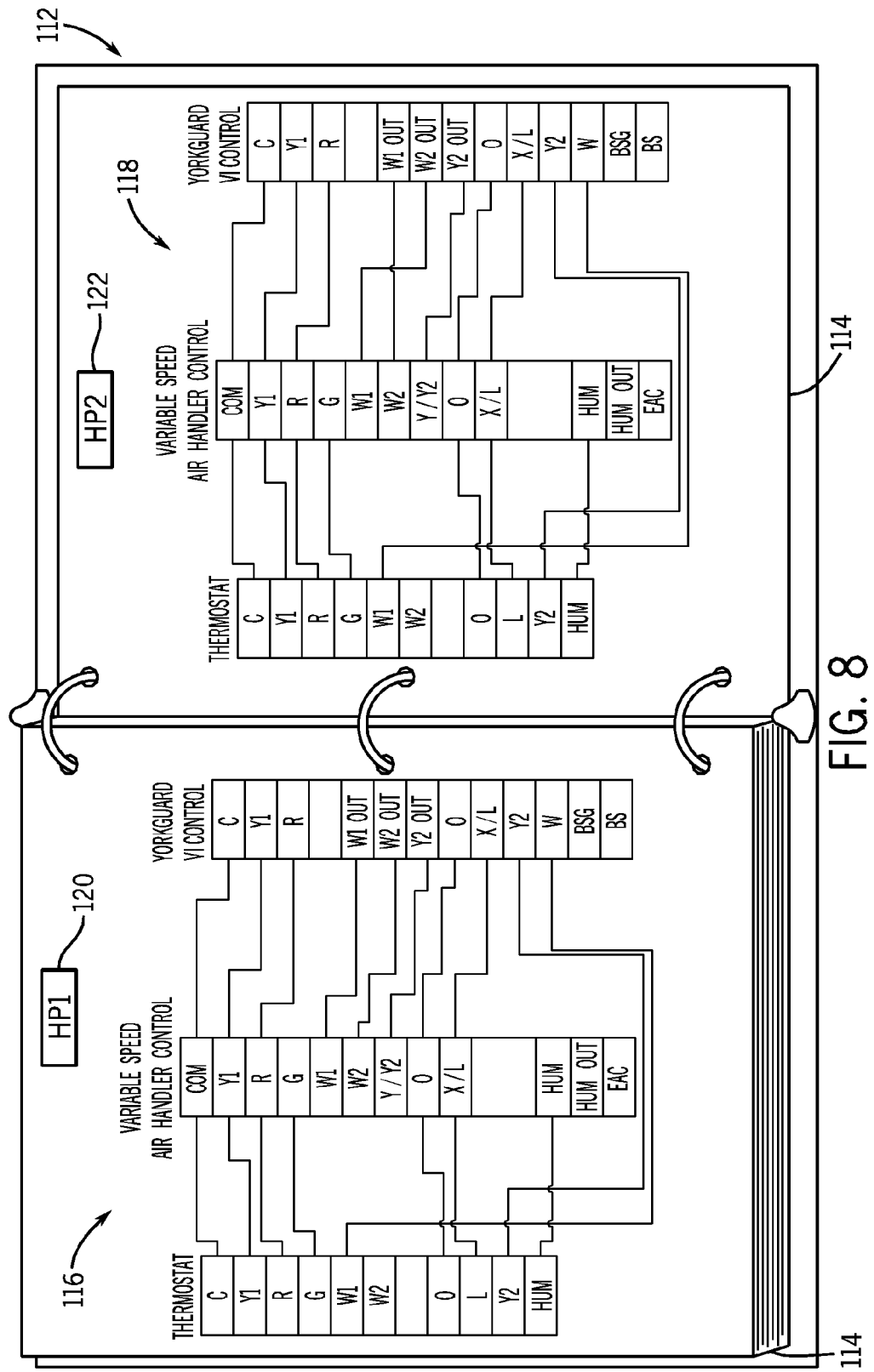
FIG. 8 is a perspective view of wired system arrangements corresponding to system identifiers.

FIG. 8 illustrates a reference book 112 containing pages 114 that each depict a HVAC system configuration 116 or 118. System configurations 116 and 118 are illustrated using wiring diagrams or arrangements that may be employed in a conventional 24 VAC controlled system. System identifiers 120 and 122 identify each system configuration 116 and 118, respectively. Of course, the system identifiers and system configurations are shown for illustrative purposes only and many different system configurations and corresponding system identifiers may be included within the binder.

The use of wiring diagrams to represent system configurations is intended to facilitate system installation by displaying the system configurations in a format that technicians have traditionally encountered. The system identifiers 120 and 122 allow a technician to input the identifier, for example by selecting a corresponding graphical element, to program the HVAC system with the configuration represented by the wiring diagrams. The wiring diagrams are intended to represent the functionality of the HVAC system and may not physically represent the connections between control device 22 and the indoor and outdoor units. For example, control device 22 may use software and/or control logic, instead of wiring connections, to configure the system. However, the system may function in the same manner as represented by the wiring arrangements 116 and 118 even though digital communications may be used instead of 24 VAC signals and relays. Further, in certain embodiments, combinations of wiring connections and software may be used to configure the system. For example, the control device may prompt a service technician to make specific wiring connections and then may use software to program other connections.

In other embodiments, the system configurations may be represented by flowcharts or tables representing the system functionality. For example, tables may indicate the number of stages within the system, the type of auxiliary heat applied, and the auxiliary equipment included, among other things. Further, the binder may not be presented in a physical form. For example, the binder may be stored and accessed electronically through an application stored on a laptop or other electronic device. In other embodiments, the information shown in the binder may be displayed on the display of the control device. For example, the wiring diagrams associated with the system identifiers may be stored within memory 72 and displayed in response to selection of the graphical elements representing system identifiers. In a specific example, referring to FIG. 7, selection of graphical element 100 may cause wiring diagram 116 to be displayed on display 36. In other embodiments, wiring diagrams may be configured by a user by dragging and dropping connections displayed on the touch screen. For example, a user may move one or more virtual wiring connections shown on the display to program the HVAC system.

Figure 9:
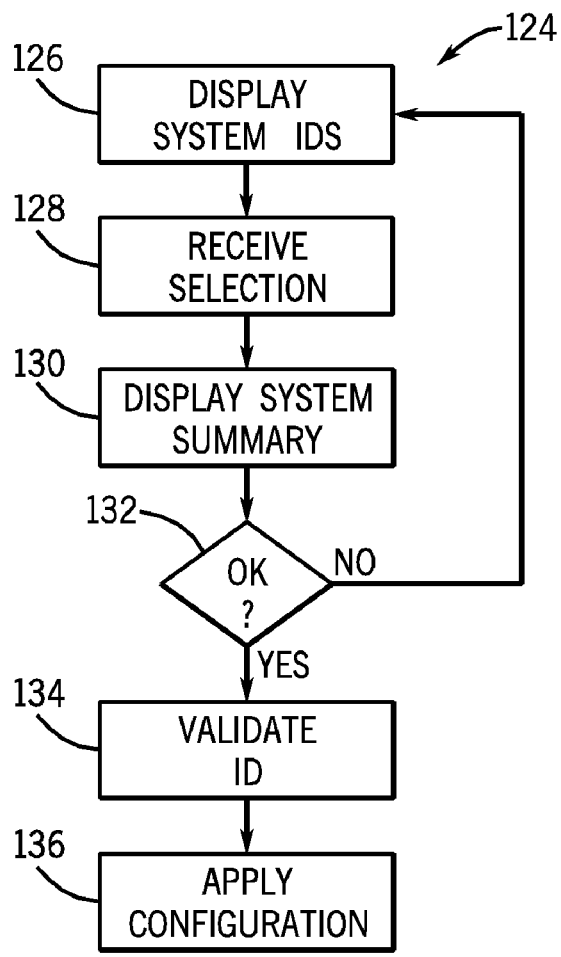
FIG. 9 is a flowchart depicting a method for configuring an exemplary HVAC system.

FIG. 9 is a flowchart depicting an exemplary method 124 for configuring an HVAC system using a system identifier. The method may begin by displaying (step 126) system identifiers. For example, the control device may retrieve a set of system identifiers stored in the memory and display the identifiers on the display. The control device also may retrieve the system identifiers from control circuits of the indoor and outdoor units. For example, if the control device within a system is replaced, the control device may retrieve the current system identifiers from the indoor and outdoor units connected to the control device. In certain embodiments, the control device may display the system identifiers on a touch screen as graphical elements that may be selected by a user as shown in FIG. 7. The control device may then receive (step 128) a selection from a user. For example, the selection may be received when a user contacts the graphical element displayed on the touch screen. In other embodiments, the selection may be received through the I/O port of the control device.

In response to receiving selection of a system identifier, the control device may display (step 130) a system summary describing the system configuration associated with the system identifier. For example, the system summary may include the types of units within the system (for example, heat pump, air conditioning unit, furnace, and air handler), the number of stages within the system, the type of auxiliary heating, and the heating and cooling capacities for each stage among other things. The system summary may be shown on the display of the control device or it may be shown on an external display connected to the control device through the I/O port.

In conjunction with the system summary, the control device may display graphical elements or text prompting a user to accept the system configuration. The control device may then receive a user input indicating whether the system configuration, as described by the system summary, is acceptable (step 132). In certain embodiments, a user may select a button or graphical element to accept or reject the system summary. If the control device receives an input rejecting the system configuration, the control device may again display the system identifiers (step 126). The system identifiers displayed may be the same system identifiers initially shown, or the system identifiers may be a shortened list of system identifiers that have system configurations similar to the previously selected system identifier configuration. Further, in certain embodiments, the control device may display a series of graphical elements that allow a user to change a property of the displayed system configuration. For example, the control device may display a graphical element allowing a user to change the number of stages in a heat pump. The control device may then display only those system identifiers that have system configurations with the selected number of heat pump stages. As may be appreciated, a series of prompts and graphical elements that represent HVAC system properties may be displayed to guide a technician to the desired system identifier.

Once the control device receives an input accepting the system identifier and corresponding system configuration, the control device may validate (step 134) the system identifier. The validation step may include detecting properties of the HVAC system units to determine whether the configuration associated with the system identifier is compatible with the HVAC system. The detected properties may include parameters of the indoor and outdoor units, such as the type of units, the sensors and other equipment installed within the units, and the control circuits present within the units. The detected properties also may include settings of the indoor and outdoor units, such as the jumper settings on the control circuits and connections between the indoor unit, outdoor unit, and the control device. In certain embodiments, the validation step may include determining whether the system identifier corresponds to system identifiers stored within the indoor and outdoor units. The validation step is described in detail below with respect to FIG. 11.

Once the system identifier has been validated, the device may apply (step 136) the system configuration associated with the system identifier. Application of the system configuration may include sending digital signals to the indoor and outdoor units control circuits to configure communication paths representing jumper setting on the board. The configuration also may include determining addresses on the indoor and outdoor control circuits for sending control signals from the controller. In certain embodiments, the processor may execute code stored within the memory to apply with the system configuration.

Figure 10:
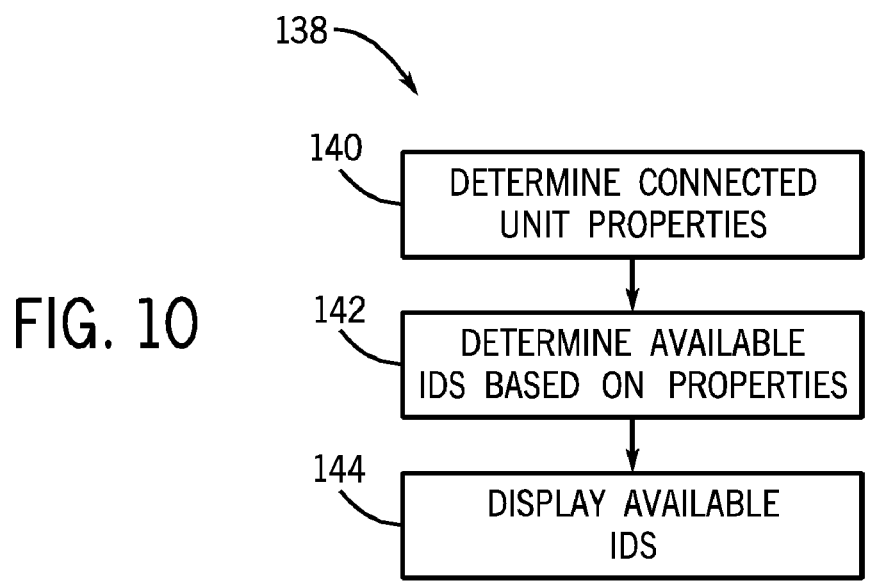
FIG. 10 is a flowchart depicting a method for determining available system configurations.

In certain embodiments, all system identifiers stored within the control device may be displayed for selection by a user (step 126). However, in other embodiments, the complete set of system identifiers may be narrowed to a smaller group of available system identifiers before display. FIG. 10 is a flowchart depicting an exemplary method 138 for determining available system identifiers. The available system identifiers may be determined based on the properties of the HVAC system. For example, the available system identifiers may depend on the type of control circuits employed within each of the indoor and outdoor units, the type of equipment located within the indoor and outdoor units, and the connections between the indoor and outdoor units.

The method may begin by determining (step 140) properties of the connected units. The control device may send a signal to the connected units to determine the type of units connected, as well as their individual properties. For example, the control device may detect the connections on the indoor and outdoor unit control circuits. The connections may provide data to the control device indicating the equipment located within the unit (for example, the types of sensors and optional components), the number of stages within the unit, the types of heating or cooling employed (for example, fossil fuel or electric auxiliary heat), and the heating and cooling capacity.

The control device may then use the detected properties to determine (step 142) available system identifiers. For example, if the outdoor unit is a heat pump, the processor may select only system identifiers that include a heat pump in the system configuration. In another example, if multiple indoor units are detected, the control device may select only system identifiers that include configurations for multiple indoor units. The determination also may be made based on more detailed aspects of the units. For example, the properties may identify auxiliary components of the units such as fossil fuel sensors, humidifiers, and electronic air cleaners and accordingly, the control device may select only system configurations with the identified auxiliary components. In certain embodiments, the determination may be made by comparing the detected properties to tables correlating detected properties to system identifiers stored within the memory of the control device. Once the available system identifiers are determined, they may be displayed (step 144). According to exemplary embodiments, the available system identifiers may be shown on the display of the control device. A user may then select a system identifier to configure the HVAC system using a method such as method 124 illustrated in FIG. 9.

Figure 11:
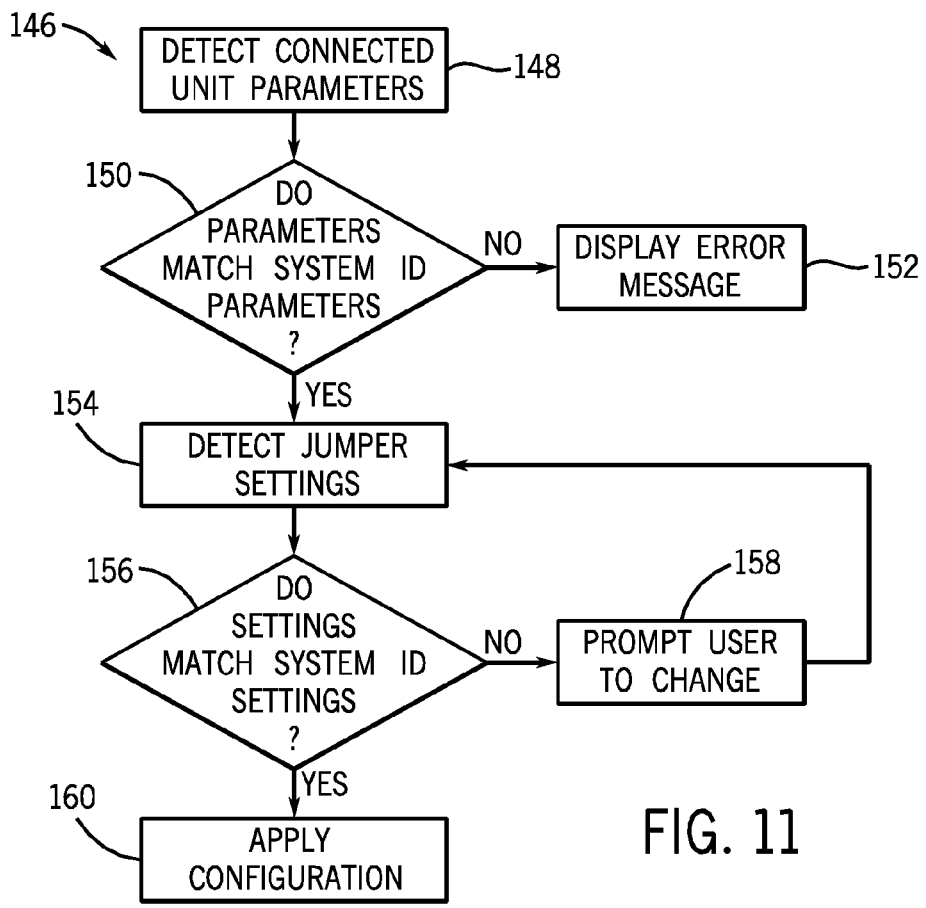
FIG. 11 is a flowchart depicting a method for validating a system configuration.

Once a system identifier is selected by a user, the control device may validate the system identifier before applying the system configuration associated with the system identifier. FIG. 11 is a flowchart depicting an exemplary method 146 for validating a system identifier. The method may begin by detecting (step 148) parameters of the connected units. The detected parameters may include physical properties of the connected units. For example, the control device may detect whether the units are heat pumps, air conditioning units, air handlers or furnaces. The control device also may detect the number of connected units within the HVAC system and the types of equipment installed within the connected units. According to exemplary embodiments, the properties may be detected by communicating with the control circuits of the units using digital signals. For example, communication packets may be sent through a serial interface to detect the parameters.

The controller may then determine whether the parameters match parameters associated with the system identifier (step 150). For example, the processor of the control device may compare the detected parameters to system identifier parameters stored within the memory of the control device. If the parameters do not match, the control device may display (step 152) an error message. In certain embodiments, the error message may instruct the technician to call the system manufacturer and may display a technical service phone number. In other embodiments, the error message may include prompts instructing the technician to perform various troubleshooting activities. For example, if an accessory within a unit is required for a system configuration associated with the system identifier, the message may prompt the technician to install the accessory within the unit. For example, the message may prompt the technician to install a bonnet sensor.

If the parameters match, the method may continue by detecting (step 154) jumper settings. The jumper settings may be located on the control circuits within the indoor and outdoor units. In certain embodiments, the jumper settings may be physical connections made between terminals using dual in-line package (DIP) switches or jumpers. However, in other embodiments, the jumper settings may represent virtual connections between control circuits made using software or control logic included within the control circuits.

The controller may then determine whether the jumper settings match the jumper settings associate with the system identifier (step 156). If the settings do not match, the controller may prompt the user to change the settings (step 158). For example, the control device may display a notification message on the display prompting the technician to make physical wiring changes to a control circuit. In other embodiments, the control device may configure the jumper settings using executable code and control signals. In these embodiments, the control device may display a message prompting the technician to confirm the jumper setting change. Upon confirmation, the control device may send a control signal to reconfigure the jumper settings to match the system identifier settings.

Once the jumper settings have been changed, the control device may again detect the jumper settings (step 154) and determine whether the settings match (step 156). If the settings match, the control device may then apply the configuration associated with the system identifier (step 160). The application of the system configuration may include reconfiguring virtual settings of the indoor and outdoor control circuits and configuring code of the processor. For example, the executable code may identify addresses on the control circuits for sending control signals. The code also may determine the specific control signals sent to the indoor and outdoor units.

Figure 12:
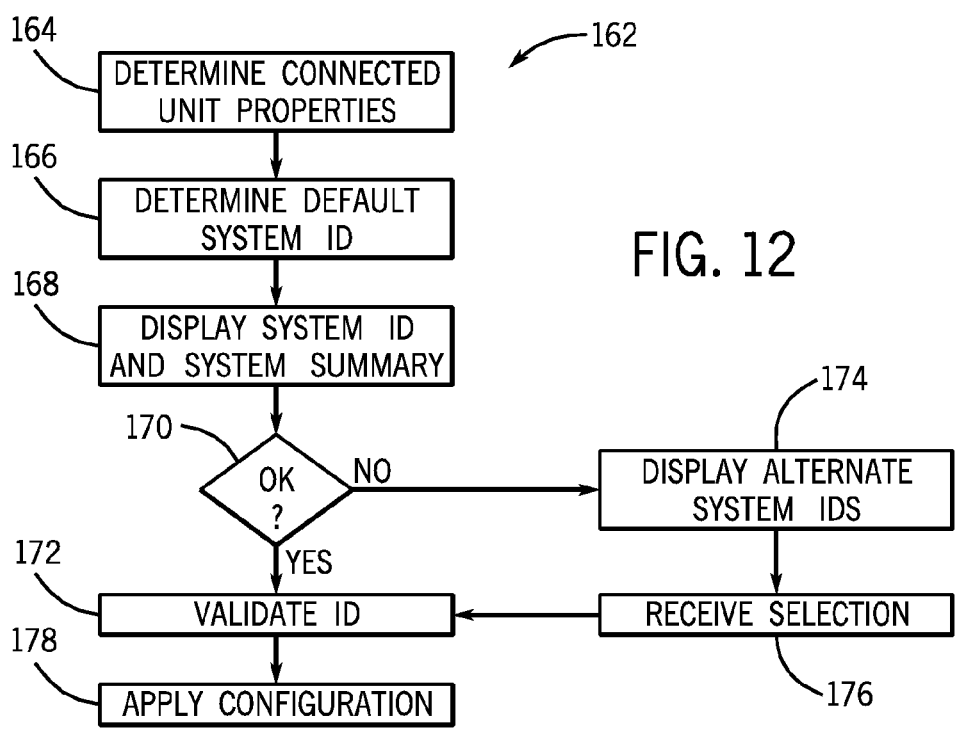
FIG. 12 is a flowchart depicting a method for configuring an exemplary HVAC system using a selection wizard.

FIG. 12 is a flowchart depicting an exemplary method 162 for configuring a unit using the smart selection wizard illustrated in FIG. 6. For example, the method 162 may be initiated in response to selection of the graphical element 92 shown in FIG. 6. The method may begin by determining (step 164) properties of the connected units. The properties may include the types of units, jumper settings, and equipment installed in the units, as well as other properties. Using these properties, the control device 22 may then determine (166) a default system identifier. In certain embodiments, the default system identifier may be the only identifier available based on the properties of the connected units. However, if two or more system identifiers may be applied based on the properties, the processor may be programmed to select a default identifier. For example, the default identifier may be set by the manufacturer for each set of properties and stored within the memory.

Further, in certain embodiments, the default identifier may correspond to a system identifier stored within control device 22 or within one of the indoor or outdoor units. For example, if an indoor unit is replaced, control device 22 may retrieve a system identifier from the outdoor unit and/or from within the control device 22 to present as the default identifier. If two different system identifiers are retrieved, control device 22 may select one of the system identifiers as the default identifier based on the properties. Moreover, in certain embodiments, control device 22 may prompt a user to select one of the stored system identifiers as the default identifier. In other embodiments, control device 22 may prompt the user for input used to determine the system identifier.

After determining the default system identifier, the control device may display (step 168) the system identifier and a system summary describing the functionality of the system configuration associated with the system identifier. In certain embodiments, the system summary may be a wiring diagram shown on the display. However, in other embodiments, the system summary may include textual and/or graphical images identifying the functionality of the system configuration.

The method may continue by receiving an input from a user indicating whether the system identifier is acceptable (step 170). If the default identifier is acceptable, the control device may validate (step 172) the system identifier. The validation process may occur as described with respect to FIG. 11. If, however, the default system identifier is not acceptable, the control device may display (step 174) alternate system identifiers. For example, the alternate system identifiers may represent other available system configuration based on the detected properties. The control device may then receive a selection input (step 176) specifying one of the alternate system identifiers. The system may then validate the system identifier (step 172). After successful validation, the control device may apply (step 178) the system configuration. According to exemplary embodiments, the application of the system configuration may include reconfiguring settings of the indoor and outdoor control circuits and configuring code of the processor. The settings may enable the control device to operate the HVAC system per the configuration associated with the system identifier.

Figure 13:
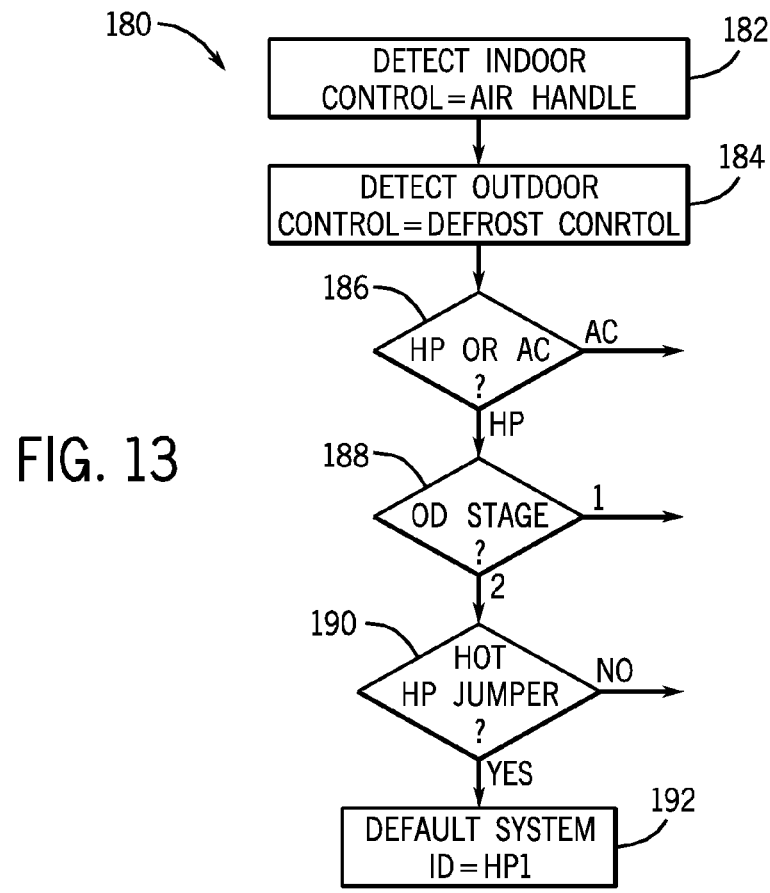
FIG. 13 is a flowchart depicting a method for configuring an HVAC system that includes a two stage heat pump.

FIG. 13 is a flowchart depicting an exemplary method 180 for configuring an HVAC system using the selection wizard in an HVAC system where the indoor unit is an air handler and the outdoor unit is a heat pump. The method 180 may be one of many exemplary methods of performing step 156 shown in FIG. 12. The method may begin by detecting that the indoor control circuit represents an air handler (step 182). The detection may be done by exchanging digital control signals through a serial interface with the indoor control circuit. For example, the processor of the control device may initiate a control signal requesting the unit type from the indoor control circuit.

The control device may then detect that the outdoor control circuit is a defrost control circuit (step 184). The detection may be performed using digital control signals. The control device may then determine whether the outdoor unit is a heat pump or an air conditioner (step 186). If the control device detects that the outdoor unit is a heat pump, the control device may then determine the number of stages within the outdoor unit (step 188). If the control device determines that the outdoor unit has two stages, the control device may then determine whether a hot heat pump jumper is present on the outdoor control circuit (step 190). If the hot heat pump jumper is present, the control device may select "HP1" as the default system identifier. The system identifier "HP1" may have a system configuration compatible with an air handler and a two-stage heat pump that has a hot heat pump jumper setting. If any of the conditions illustrated in FIG. 13 are not present, for example if the outdoor unit is an air conditioner, the processor may follow other control logic (not shown) to determine another default system identifier. The steps of method 180 are provided for illustrated purposes only. Many other properties, such as the type of auxiliary equipment present, may be used to determine the default system identifier.

Figure 14:
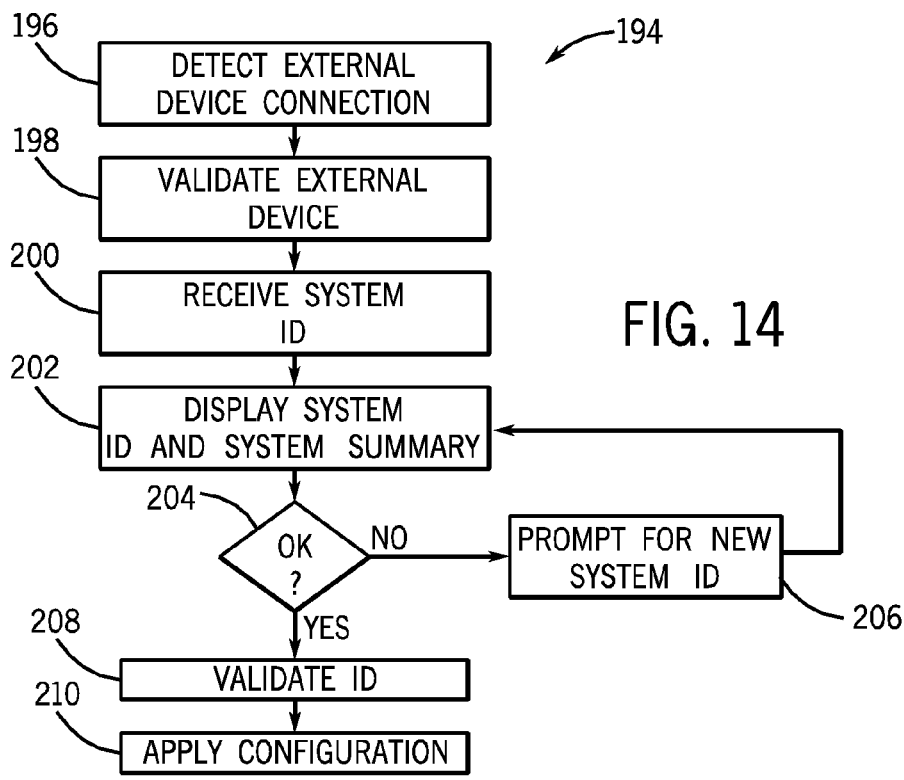
FIG. 14 is a flowchart depicting a method for configuring an HVAC system using an external device.

FIG. 14 is a flowchart depicting an exemplary method 194 for receiving a system identifier through an external device. The method may begin by detecting (step 196) connection of an external device. In certain embodiments, the detection may be initiated by selection of graphical element 94 shown in FIG. 6. In other embodiments, the detection may occur automatically when an external device is connected. The external device may be connected through the I/O port of the control device. The control device may then validate (step 198) the external device. For example, the control device may prompt a user to enter a pin or password to allow communication with the external device. In other embodiments, the control device may recognize the external device as a device authorized to communicate with the control device. For example, the identities of authorized device may be stored within the memory of the control device.

After validation, the control device may receive (step 200) a system identifier from the external device. The system identifier may be received through the I/O port. Upon receipt, the control device may display (step 202) the system identifier and a summary of the configuration associated with the system identifier. The method may then continue by prompting a user to accept or reject the system identifier (step 204). If the user rejects the system identifier, the control device may prompt (step 206) the user to enter another system identifier. The user may select the system identifier from a list or the user may manually enter the system identifier using a key pad located on the control device or on the external device. Once the system identifier has been input by the user, the control device may again display (step 202) the system identifier and a summary of the system configuration. If the user accepts the system identifier, the control device may validate (step 208) the identifier. The validation may be performed using the method 146 shown in FIG. 11. After successful validation, the control device may apply (step 210) the system configuration. According to exemplary embodiments, the application of the system configuration may include reconfiguring settings of the indoor and outdoor control circuits and configuring code of the processor.

The control devices and system configuration methods described in FIGS. 3 through 14 may find application in a variety of HVAC systems. However, the devices and methods are particularly well-suited to residential HVAC systems with at least one indoor unit and at least one outdoor unit. The devices and methods are also well-suited to variable refrigerant flow (VRF) HVAC systems where one outdoor unit is connected to multiple indoor units. The devices and methods also may be employed in HVAC systems with only one connected indoor or outdoor unit. The devices and methods are intended to facilitate configuration of HVAC communicating systems that partially or entirely employ digital control signals.

While only certain features and embodiments of the invention have been illustrated and described, many modifications and changes may occur to those skilled in the art (e.g., variations in graphical elements and visual schemes of the user interface, shapes and proportions of the various elements, the types of properties and parameters detected, use of materials, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method for configuring a heating, ventilating, air conditioning, or cooling system, the system including at least one HVAC unit communicatively coupled to a control device for the exchange of control signals, the HVAC unit including a control circuit, the method comprising:
 receiving a user input of a system identifier from a plurality of system identifiers that are compatible with properties of the system and the control circuit of the at least one HVAC unit, wherein each system identifier specifies a wired system arrangement of hardwired connections within the system, and wherein the hardwired connections define an operational configuration of the system; and
 digitally configuring one or more components of the system based upon the received user input of the system identifier to create digital communication paths representing the hardwired connections to set the system to the operational configuration, wherein the one or more components comprise the control circuit of the HVAC unit, or the control device, or both, and wherein at least one of the one or more components comprises a replacement component.

2. The method of claim 1, comprising:
 transmitting digital signals to the control circuit to detect components communicatively coupled to the control circuit; and
 presenting to a user a plurality of system identifiers compatible with the detected components.

3. The method of claim 2, wherein the detected components include at least one of a motor, an electronic expansion valve, a reversing valve, and a compressor.

4. The method of claim 1, comprising:
 storing the system identifier within a memory of the control device; and
 transmitting the system identifier to the HVAC unit for storage within the HVAC unit.

5. The method of claim 4, wherein the replacement component comprises a replacement control device, and comprising:
 retrieving the system identifier from the HVAC unit; and
 configuring the replacement control device based upon the retrieved system identifier.

6. The method of claim 4, wherein the replacement component comprises a replacement HVAC unit that includes a replacement control circuit, and comprising:
 retrieving the system identifier from the control device; and
 configuring the replacement HVAC unit based upon the retrieved system identifier.

7. The method of claim 1, comprising providing for display, in response to receiving the user input, a graphical representation of the wired system arrangement that depicts the hardwired connections.

8. The method of claim 7, comprising:
 displaying, on a touch screen, a graphical representation of the wired system arrangement that depicts the hardwired connections; and
 receiving a user input through the touch screen that moves one of the hardwired connections to a new location within the wired system arrangement.

9. A control device for a heating, ventilating, air conditioning, or cooling system, the system including one or more indoor units and one or more outdoor units coupled to one another to implement a refrigeration cycle and coupled to the control device for the exchange of control signals, each of the indoor and outdoor units including a respective control circuit, the control device comprising:
 a processor;
 a user interface for receiving a user input selecting a system identifier from a plurality of system identifiers that are compatible with properties of the control circuits of the indoor and outdoor units, wherein each system identifier specifies a wired system arrangement of hardwired connections within the system, and wherein the hardwired connections define an operational configuration of the system; and a computer readable storage medium having configuration code encoded thereon, wherein the configuration code is executable by the processor and comprises code for:

discovering the properties of the control circuits of the indoor and outdoor units;

determining the plurality of system identifiers based on the properties;

digitally configuring a replacement control circuit for at least one of the respective control circuits to create digital communication paths representing the hardwired connections to set the system to the operational configuration corresponding to the selected system identifier.

10. The control device of claim 9, wherein the operational configurations corresponding to the system identifiers include at least one of a heat pump providing two stages of cooling and three stages of heating, or an air conditioner providing modulating cooling and a furnace providing modulating heating.

11. The control device of claim 9, wherein the computer readable storage medium comprises code for selecting a default system identifier and at least one alternative system identifier from the plurality of system identifiers.

12. The control device of claim 9, wherein the user interface includes a touch screen.

13. The control device of claim 9, wherein the user interface includes a port for receiving a solid state memory circuit.

14. The control device of claim 9, wherein the user interface includes a wireless link.

15. The control device of claim 9, wherein the properties identify types of equipment included within the indoor and outdoor units, types of heating or cooling employed by the indoor and outdoor units, or a number of stages within the indoor and outdoor units, or a combination thereof.

16. The control device of claim 9, wherein digitally configuring comprises assigning terminal addresses on the indoor and outdoor control circuits for communicating with the control device.

17. The control device of claim 9, wherein at least one of the digital communication paths represents a jumper setting on the indoor or outdoor control circuit.

18. The control device of claim 9, comprising a display, wherein the computer readable storage medium comprises code for displaying a graphical representation of the wired system arrangement on the display, and wherein the wired system arrangement depicts the hardwired connections.

19. The method for configuring a heating, ventilating, air conditioning, or cooling system, the system including an indoor unit and an outdoor unit coupled to one another to implement a refrigeration cycle and coupled to a control device for the exchange of control signals, each of the indoor and outdoor units including a respective control circuit, the method comprising:

receiving a user input of a system identifier from a plurality of system identifiers that are compatible with properties of the system and the control circuits of the indoor and outdoor units, wherein each system identifier specifies a wired system arrangement of hardwired connections within the system, wherein the hardwired connections define an operational configuration of the system;

displaying, on the control device, a graphical representation of the wired system arrangement that depicts the hardwired connections;

digitally configuring one or more components of the system based upon the received user input of the system identifier to create digital communication paths representing the hardwired connections to set the system to the operational configuration, and wherein the one or more components comprise the indoor unit control circuit, the outdoor unit control circuit, or the control device, or a combination thereof, and wherein at least one of the one or more components comprises a replacement component.

20. The method of claim 19, comprising detecting parameters for at least one of the outdoor unit or the indoor unit and comparing the parameters to the operational configuration to validate the system identifier.

21. The method of claim 20, wherein the parameters specify the equipment connected to at least one of the outdoor unit control circuit or the indoor unit control circuit.

22. The method of claim 20, wherein the parameters include jumper settings for at least one of the indoor unit control circuit or the outdoor unit control circuit.

23. The method of claim 20, wherein the parameters identify the contactors connected to at least one of the outdoor unit control circuit or the indoor unit control circuit.

24. The method of claim 19, comprising prompting a user to confirm the system identifier based on the graphical representation of the wired system arrangement.

* * * * *